United States Patent

Sumida et al.

[11] Patent Number: 5,928,004
[45] Date of Patent: Jul. 27, 1999

[54] ELECTRICAL CONNECTION BOX FOR AN AUTOMOTIVE VEHICLE

[75] Inventors: Tatsuya Sumida; Yoshihiro Maeda, both of Yokkaichi, Japan

[73] Assignee: Sumitomo Wiring Systems, Ltd., Japan

[21] Appl. No.: 08/773,202

[22] Filed: Dec. 23, 1996

[30] Foreign Application Priority Data

Dec. 28, 1995 [JP] Japan .................................. 7-343029
Dec. 28, 1995 [JP] Japan .................................. 7-343036
Dec. 28, 1995 [JP] Japan .................................. 7-343037

[51] Int. Cl.⁶ .................................................. H01R 9/09
[52] U.S. Cl. ........................................................ 439/76.2
[58] Field of Search ................................... 439/76.1, 941, 439/210, 211, 212, 213, 404, 67, 77, 76.2

[56] References Cited

U.S. PATENT DOCUMENTS 5,023,752  6/1991  Detter et al. ............................ 361/399
5,478,244  12/1995  Maue et al. ............................ 439/76.2
5,718,598  2/1998  Saka et al. ............................ 439/404

FOREIGN PATENT DOCUMENTS 0 665 570 A2  8/1995  European Pat. Off. .
59-28821  2/1984  Japan .
59-44911  3/1984  Japan .
1-202109  8/1989  Japan .
2-136989  11/1990  Japan .
7-298452  11/1995  Japan .
WO 94/29145  12/1994  WIPO .

*Primary Examiner*—Neil Abrams
*Assistant Examiner*—Barry M. L. Standig
*Attorney, Agent, or Firm*—Anthony J. Casella; Gerald E. Hespos; Ludomir A. Budzyn

[57] ABSTRACT

To downsize a large electrical connection box such as a junction block and to enable the mounting of a compact integrated fuse therein. Internal circuits are accommodated in a casing comprised of a lower casing 10 and an upper casing 11, and are divided into large current circuits, medium current circuits and small current circuits. The large current circuits are constructed by a busbar 18, the medium circuits by wires 16 and cramping terminals 17, and the small current circuits by a flexible printed circuit (FPC) 19. A fuse box 13 into which a compact integrated fuse 14 is fitted is arranged on the upper surface of the FPC 19, and upstream and downstream contact surfaces of narrowly and parallelly arranged fusible elements 34 of the fuse 14 are connected with the wires 16 and the FPC 19, respectively.

7 Claims, 13 Drawing Sheets

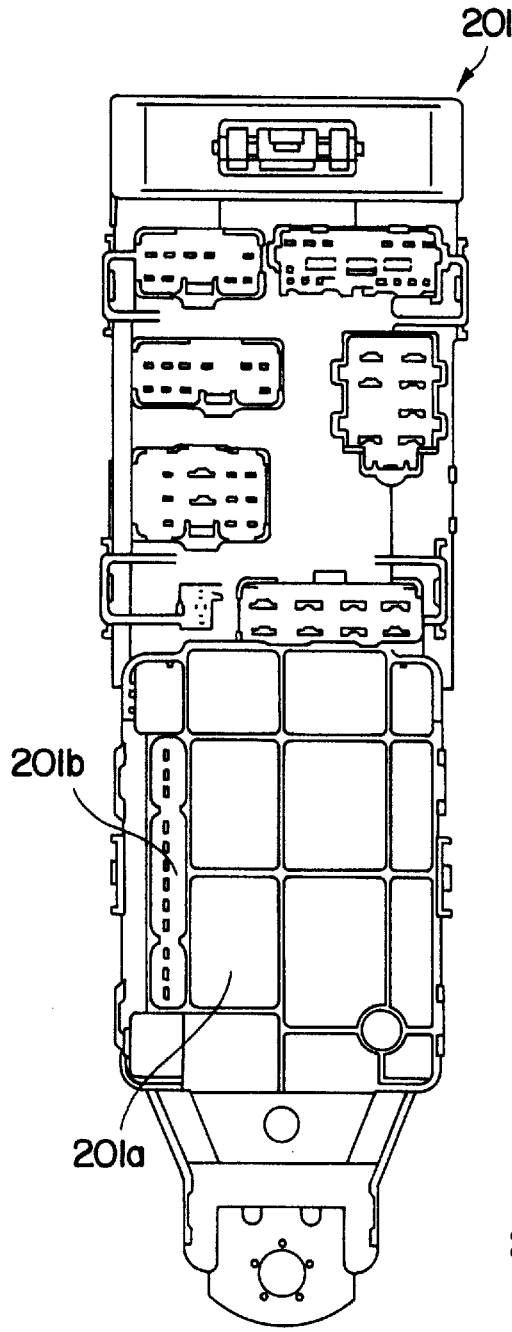
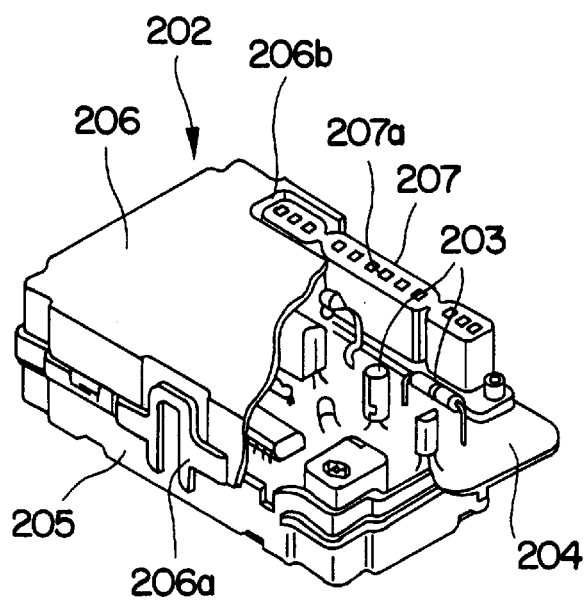
FIG.16(A) PRIOR ART
FIG.16(B) PRIOR ART

ELECTRICAL CONNECTION BOX FOR AN AUTOMOTIVE VEHICLE

BACKGROUND OF THE INVENTION

1. Field of the Invention

The present invention relates to an electrical connection box, such a junction block for an automotive vehicle, and in particular to a compact electrical connection box in which a fuse may be mounted. The present invention further relates to an electrical connection box designed to protect circuit boards during transportation, to reduce the number of parts and to reduce production cost.

2. Description of the Prior Art

A prior art large size electrical connection box, such as a junction block, includes internal circuits that are defined by a multitude of layers of busbars. Each layer is formed by pressing a conductive metal plate. Portions of the busbars are bent upwardly or downwardly in specified positions to form tabs to be connected with external circuits. The respective busbar layers are separated from one another by insulation plates.

If the internal circuits are constructed by busbars, production costs may increase because the shape of the busbars needs to be changed when the circuits are changed. In view of this problem, some internal circuits are constructed partially by busbars and partially by wires W and cramping terminals T connected with the wires W, (Japanese Unexamined Utility Model Publication No. 2-136989). Alternatively the internal circuits may be constructed only by wires and cramping terminals.

There are limits to downsizing electrical connection boxes. More specifically, if the minimum distance between adjacent tabs is shorter than 4 mm, a punch may not have sufficient strength to form the conductive metal plate. In particular, the punch may be broken or the formed busbars may not have accurate dimensions. As a result the minimum distance between adjacent tabs formed in busbars typically is 4 mm. These dimensions prevent busbars from being used with closely spaced connectors or with compact integrated fuse having fusible elements arranged at intervals smaller than the spacing of the busbars. Accordingly, it is necessary to use larger connectors and larger fuses with busbars, thereby making the prior art electrical connection box large.

If the internal circuits are constructed by wires and cramping terminals, the intervals between connectors or fuses typically is determined by the size of the cramping portions. Thus, miniaturization necessitates smaller cramping terminals or thinner wires. However, smaller prior art cramping terminals cannot generate a sufficient connection force. On the other hand, thinner wires elongate during manufacturing, thereby causing a problem during assembling.

To respond to an increase of signal circuits as the internal circuits in recent years, the applicant of the present invention proposed a flat fuse 3 in which fusible elements 2 made of a metal wire or a metal foil tape are arranged in parallel and are adhered to both front and rear surfaces of an insulation plate 1 at specified intervals as shown in FIGS. 6(A) and 6(B) of this application and in Japanese Patent Applications Nos. 7-91698 and 7-91699. FIGS. 6(A) and 6(B) also show a fuse cover 5, an upper casing 6 of the electrical connection box, and a fuse fitting portion 6a provided at the upper casing. If this flat fuse 3 is used, circuits cannot be connected with the fusible elements 2A, 2B, . . . in one-to-one relationship without enlarging an installation space.

This prior art compact fuse creates busbar manufacturing difficulties. Specifically, the busbar is formed by pressing a conductive metal plate. Portions of the busbar are bent upright to form tabs. These tabs need to be connected with the terminals of the fuse. At this time, it is necessary to form the narrowly spaced parallel tabs to conform to the narrowly spaced parallel fusible elements of the flat fuse. However, as noted above, it is difficult to form busbars having such tabs because of a limit in punching strength tolerated by a press used to form the busbars. In other words, the use of a conventional busbar as the internal circuits of the electrical connection box is not compatible with the compact integrated fuse.

The above problem can be solved if the busbar can be connected with the compact integrated fuse by forming tabs to be connected with adjacent fusible elements not in the same busbars, but in busbars at different layers. However, in such a case, the number of busbar layers increases, leading to an increased production cost, making the electrical connection box larger and complicated, and eliminating a degree of freedom in circuit designing for the busbar.

Furthermore in a prior art circuit protection system for an automotive wiring harness, a fuse is provided between a power source and a load so that, upon a flow of an overcurrent, it blows out to protect the circuitry. Fuses used in the prior art devices include blade fuses and mini fuses. These fuses have a single electrode and, therefore, can be connected with only a single circuit.

It is often desirable to connect essential circuits to fuses in one-to-one relationship. It also is sufficient that the current carrying capacity of the fuses be below 5 ampere (A). However, as shown in FIG. 12, a plurality of circuits C1 to C3, at present, are collected into one circuit C4 which is connected with one fuse H of 5 A or larger. About 70% of the circuits connected with the fuses are signal circuits connected with loads having a current carrying capacity of 1 A or smaller. Even in this case, a plurality of signal circuits also are collected and connected with a fuse having a current carrying capacity of 5 A or larger.

However, in the case that a plurality of circuits are collected and connected with one fuse as described above, even if the fuse blows out when a problem occurs in a circuit which is not particularly important, essential circuits connected with the same fuse are affected. This problem can be avoided by connecting the essential circuits with the fuses in one-to-one relationship, but this leads to an increase in the number of fuses to be installed. Especially when prior art blade fuses are adopted, a space for installing these fuses considerably increases, thereby making the electrical connection box larger.

However, if a conventionally used busbar is adopted as circuits of the electrical connection box to be connected with the flat fuse, it is difficult to provide connection terminals to be connected with the respective fusible elements of the flat fuse.

As shown in FIG. 16, electrical connection boxes 201 of the above type have conventionally been shipped to a car manufacturer while electronic units 203 are accommodated in electronic unit containers 202 separate from the electrical connection boxes 201 in order to prevent circuit boards 204 carrying the electronic units 203 from being damaged during transportation to the car manufacturer. At an assembly line of automotive vehicles, the containers 202 housing the electronic units 203 corresponding to the grades of the vehicles are fittably connected with container mount portions 201a of the electrical connection boxes 201.

The above electronic unit container 202 is comprised of lower and upper casings 205, 206 which can be lockingly fitted with each other. The electronic unit container 202 is mounted on the electrical connection box 201 by engaging a locking portion 206a formed on the outer surface of the upper casing 206 with an engaging portion (not shown) of the electrical connection box 201. Further, an opening 206b for exposing a fitting portion 207a of a connector 207 connected with the circuit board 204 is formed in the upper surface of the upper casing 206 so as to allow the connection of the connector 207 with a connector portion 201b of the electrical connection box 201.

The electrical connection box 201 needs the separate electronic unit container 202, which increases the number of parts. Accordingly, there is a problem of a high production cost. Further, since two parts: the electrical connection box 201 and the electronic unit container 202 have to be shipped to the car manufacturer, there is a problem of a higher transportation cost.

Furthermore, at the assembly line, when the container 202 is fittably connected with the electrical connection box 201, an electrical connection check for checking whether or not the box 201 and the container 202 are securely connected cannot be made. Accordingly, when the container 202 is improperly connected with the electrical connection box 201, the electrical connection box 201 cannot properly function.

The present invention was developed in view of the above problems, and an object thereof is to downsize a large electrical connection box such as a junction block by forming conductive members of internal circuits of the electrical connection box in conformity with amounts of current to flow in the circuits and arranging the conductive members at small intervals so as to be connected with external terminals.

It is another object of the present invention is to provide an electrical connection box with internal circuits easily connectable with parallel narrowly arranged fusible elements of a compact integrated fuse.

SUMMARY OF THE INVENTION

The subject invention relates to an electrical connection box for an automotive vehicle, comprising internal circuits which are accommodated in a casing. The internal circuits may be divided at least into large current circuits, medium current circuits and/or small current circuits. The large current circuits are constructed substantially by at least one busbar. The medium current circuits are constructed substantially by one or more wires and/or one or more cramping terminals connectable with the wires. The small current circuits are constructed by at least one flexible printed circuit (FPC). For example, a current of 50 ampere (A) or larger flows in the large current circuits; a current of 5 A or smaller flows in the small current circuits; and a current of 5 A to 50 A flows in the medium current circuits. The internal circuits may comprise at least two of the group of large current circuits, medium current circuits and/or small current circuits.

If the conductive members are changed depending upon an amount of current to flow in the internal circuits of the electrical connection box as described above, the electrical connection box can be made smaller since small connectors can be connected with external load circuits to be connected with the circuits constructed by the FPC. Further, since only the large current circuits are constructed by the busbar, many load side circuits connected with the busbar via fuses are constructed by the wires or the FPC. Accordingly, smaller connectors can be connected, and a compact arrangement inside the electrical connection box can be realized. In this respect as well, the electrical connection box can be made smaller.

The specific construction of the electrical connection box is preferably such that the wires of the medium current circuits are arranged along wire arrangement guides provided at an insulation plate to be disposed in the casing. The busbar, as the large current circuits, is placed or arranged on one or more busbar arrangement planes, in particular on the upper ends of the wire arrangement guides, so as to arrange the wires and the busbar on different or spaced planes or at different heights. The FPC, with the small current circuits, is folded at one end surface of the insulation plate so as to extend along a first or upper surface and a second or lower surface of one side portion of the insulation plate.

If the wires are arranged in recesses defined between the wire arrangement guides provided at the insulation plate while the busbar is placed on the upper end surfaces of the wire arrangement guides as described above, it is not necessary to separate the busbar and the wires using an insulation plate. As a result the space inside the electrical connection box can be more efficiently utilized. Further, since the FPC can be folded at the one end surface of the insulation plate where the wires are arranged it can be efficiently arranged without taking up a large space. Since the conductive members are efficiently arranged in the electrical connection box taking advantage of their characteristics, the electrical connection box can be made smaller.

A fuse box provided with a fuse receptacle may be lockingly mounted by a fuse box locking portion projecting from a portion of the insulation plate. A connector box also may be lockingly mounted by a connector box locking portion projecting from a side portion of the insulation plate. Further, the casing is preferably formed with an opening through which the fuse box projects and an opening through which the connector box projects.

With the above construction, the fuse box and the connector box can be easily mounted on both upper and lower surfaces of the insulation plate where the FPC is arranged, and can project out of the upper and lower casings, respectively. As a result, an easy connection of fuses and connectors to be fitted into these boxes with the FPC can be ensured.

A compact integrated fuse, in which fusible elements are arranged at specified or predetermined intervals on a fuse insulation plate, may be fitted into the fuse fitting portion of the fuse box. Preferably, upstream contact surfaces of the fusible elements are connected with the wires via connection terminals. The wires can have medium sized cores, and hence can be assembled without the elongation associated with thin wires as explained above. Further the cramping terminals are large enough to develop sufficient force with the wires. Downstream contact surfaces of the fusible elements are connected with the FPC, preferably on the first or upper surface of the insulation plate. Terminals preferably are connected with the FPC on the second or lower surface of the insulation plate, and preferably are caused to project into terminal chambers of the connector box.

With the above construction, the internal circuits of the electrical connection box are connected with the integrated fuse by connecting the terminals connected with the wires with the upstream side of the integrated fuse comprising the narrowly arranged parallel fusible elements, and connecting the terminals connected with the FPC with the downstream side of the integrated fuse.

Further, a relay for a circuit board, a noise filter, a diode or like electronic devices preferably are placed on the FPC on the first or upper surface of the insulation plate and are connected with one or more conductive paths of the FPC. If the electronic devices are mounted and connected with the FPC on the first or upper surface of the insulation plate, they can be easily disposed without taking up a large space with specified receptacles inside the electrical connection box as had been done in the prior art.

Preferably, tabs are provided at the busbar used in the large current circuits for connection with external terminals. Similarly cramping terminals connected with the wires for the medium current circuits each are provided with an external terminal connection portion so as to be connectable with external terminals.

The invention also is directed to an electrical connection box in which a fuse comprises fusible elements arranged at one or more intervals over opposite surfaces of an insulation plate. Internal circuits of the electrical connection box are connected with upstream and downstream sides of the fusible elements. One or more upstream conductive elements are used as internal circuits to be connected with the upstream contact surfaces of the fusible elements. One or more downstream conductive elements are used as internal circuits to be connected with the downstream contact surfaces of the fusible elements.

Thus, production costs are reduced by eliminating a container for accommodating an electronic circuit board. Furthermore there is provided an electrical connection box that is capable of preventing a connection failure of the electronic circuit board with connection terminals to be connected with tabs of the busbars.

Connection means are provided for connection with the upstream and/or downstream contact surfaces of the fusible elements, respectively. As noted above, wires are used as upstream conductive elements, while at least one flexible printed circuit is used as one or more downstream conductive elements. Connection terminals may be used as the connection means and may be connected with the wires and the flexible printed circuit, respectively. Wires may be used as the upstream conductive elements as well as one or more of the downstream conductive elements, and connection circuits may be connected with the wires. Similarly, flexible printed circuits may be used as the upstream conductive elements as well as one or more downstream conductive elements, and connection circuits may be connected with the flexible printed circuits.

Cramping terminals connectable with the wires may be provided. Each cramping terminal may be formed at its one side with a slot into which the one or more conductive elements is pressed and may be formed at the other side with at least one tab to be connected with a female connection portion of an intermediate terminal. The intermediate terminal preferably is formed with a spring contact portion for coming into contact with the contact surface of the corresponding fusible element of the fuse.

It should be appreciated that the terminal for connecting the wire and the fuse is not limited to a combination of the cramping terminal and the intermediate terminal, but the cramping terminal to be connected with the wire may be provided with a spring contact portion to be brought into pressing contact with the fusible element of the fuse, eliminating the need for the intermediate terminal.

The connection means to be connected with the flexible printed circuit, each are provided with an electrical connection portion formed at one end thereof with at least one projection, in particular having a needle-like leading end. Each of the electrical connection portions may be secured to the flexible printed circuit by soldering after being pierced through a conductive portion of the flexible printed circuit. The connection means also may be formed at the other end with a spring contact portion for coming into pressing contact with the contact surface of the corresponding fusible element of the fuse.

The terminal to be connected with the FPC by soldering may be provided with a female connection portion, and may be connected with the fusible element of the fuse by connecting the above intermediate terminal with the female connection portion.

In the case that the circuits upstream from the fuse are constructed by wires, and the connection terminals are connected with the FPC as the circuits downstream from the fuse by soldering, soldering is performed using a device which prevents solder from flowing to the wire connection side.

If, instead of the conventionally used busbars, the wires and the FPC are used as internal circuits of the electrical connection box to be connected with the upstream or power source connection side and the downstream or load connection side of the compact integrated fuse, respectively, the connection terminals can be mounted at small intervals so as to be connected with the narrowly spaced parallel fusible elements of the integrated fuse. It should be appreciated that the internal circuits of the electrical connection box are not limited to the wires and FPCs, but busbars may be used in portions which are not connected with the integrated fuse.

Since a large current is allowed to flow if wires having a thick single core are used upstream from the integrated fuse, the wires can be suitably used to construct the circuits upstream from the integrated fuse. Further, since it is sufficient that a small current be allowed to flow through the circuits downstream from the integrated fuse, the FPC can be suitably used to construct such circuits.

Wires may be used as internal circuits to be connected with upstream and downstream contact surfaces of the fusible elements, and connection circuits connected with the wires may be connected with the upstream and downstream contact surfaces of the fusible elements. In this way, the circuits to be connected with the upstream and downstream sides of the fuse may be both constructed by the wires. In such a case, it is desirable to use wires having a thick single core as the upstream side circuits and to use wires having a narrow single core as the downstream side circuits.

Since both upstream and downstream side circuits may be constructed by wires, the connection terminals can be mounted at the same intervals as the narrowly arranged parallel fusible elements of the integrated fuse, thereby matching the intervals of the connection terminals and those of the fusible elements.

Further preferably, flexible printed circuit (FPCs) may be used as internal circuits to be connected with upstream and downstream contact surfaces of the fusible elements, and connection circuits connected with the FPCs may be connected with the upstream and downstream contact surfaces of the fusible elements. In this way, the circuits to be connected with the upstream and downstream sides of the fuse both may be constructed by the FPCs. In such a case, it is preferred that the upstream side FPC have thick and/or wide conductive paths so as to allow a flow of a large current and the downstream side FPC have thin and/or narrow conductive paths so as to allow only a flow of a small current.

Both in the case that the circuits upstream and downstream from the fuse are both constructed by the wires and in the case that the circuits upstream and downstream from the fuse are both constructed by the FPCs, the connection terminals can be mounted so as to conform to the narrowly arranged parallel fusible elements of the compact integrated fuse.

If the wires and the FPCs are used as described above, the problem in the busbar forming process using a large press can be avoided; the compact integrated fuse can be mounted in the electrical connection box; and the electrical connection box can be made smaller and denser.

The electrical connection box for an automotive vehicle may have a built-in electronic unit, comprising: an electronic unit container which is projectingly formed on a part of a casing of the electrical connection box and has an opening in one side surface thereof, a circuit board, and a lid at the circuit board. The lid may be lockable with or securable to the electronic unit container. Thus there is provided an electrical connection box for an automotive vehicle designed to protect circuit boards during transportation and to reduce the number of parts and to reduce production costs by forming a container for an electronic unit integrally with an electrical connection box and by assembling a circuit board carrying an electronic unit during the manufacturing of the electrical connection box.

The lid may be detachably mountable at the circuit board, and may be adapted to substantially close the opening of the electronic unit container.

Preferably, the electrical connection further comprises a locking portion provided at the lid, and an engaging portion provided at the electronic unit container so as to be engageable with the locking portion to secure the circuit board to the electronic unit container when the circuit board is inserted into the electronic unit container with the lid mounted at the one end thereof. The circuit board may be replaceably mounted on the lid so as to conform to the type and grade of a vehicle.

The electrical connection box may further comprises guide grooves which are formed in the electronic unit container, in particular in opposite inner surfaces thereof and oriented at an angle different from 0° or 180°, preferably substantially normal with respect to a direction of the opening, and in which opposite edges of the circuit board are slidably fittable or insertable. Still further preferably, leading ends of the guide grooves at the opening are tapered. The lid may be formed with a through hole used for the connection with an external wiring harness.

According to a further preferred embodiment there is provided an electrical connection box for an automotive vehicle having a built-in electronic unit, comprising a box-shaped electronic unit container which is projectingly formed on a part of an outer surface of the bottom wall of a lower casing of the electrical connection box and has an opening in one side surface thereof. The electrical connection box further includes a circuit board carrying electrical devices. A lid is detachably mountable at one end of the circuit board and is adapted to close the opening of the electrical connection box. A locking portion is provided at the lid, and an engaging portion is provided at the electronic unit container so as to be engageable with the locking portion to secure the circuit board to the electronic unit container when the circuit board is inserted into the electronic unit container with the lid mounted at the one end thereof.

As is clear from the above description, the circuit board carrying specified electronic devices in conformity with the type and grade of the vehicle is selected, replaceably mounted on the lid, and detachably mounted in the electronic unit container integrally or uniformly formed at the lower casing. Accordingly, the circuit board carrying the electronic devices can be protected during transportation to the car manufacturer by being mounted in the electronic unit container. Accordingly, the number of parts can be reduced by eliminating the need for the separate electronic unit container which is necessary with the prior art electrical connection box, with the result that a production cost can be reduced. Further, since the electronic unit is connected not at the vehicle assembly line, but during the assembling of the electrical connection box, an electrical connection check can be made for the assembled electrical connection box. Furthermore, a transportation cost can be reduced because the assembled electrical connection box, i.e. a one-piece part can be shipped to the car manufacturer.

Further, the circuit board can be inserted into the electronic unit container with an improved operability by forming the guide grooves on the opposite inner surfaces of the electronic unit container and by tapering the leading ends of the guide grooves at the opening. Further, by constructing the lid such that it is in flush with the opening edge of the electronic unit container when the lid mounted with the circuit board is properly inserted into the electronic unit container, an operator can easily see whether the circuit board is properly or partly connected.

Preferably, the circuit board is replaceably mounted on the lid so as to conform to the type and grade of a vehicle.

In the above electrical connection box, a circuit board carrying specified electronic devices in conformity with the type and grade of the vehicle is selected, mounted on the lid, and inserted into the electronic unit container formed at the lower casing. Thus, at the same time the circuit board is connected with the internal circuits of the electrical connection box, the locking portion of the lid is engaged with the engaging portion, thereby closing the opening of the electronic unit container by the lid.

Since the circuit board carrying the electronic devices is detachably insertable into the electronic unit container integrally or unitarily formed at the lower casing in this electrical connection box, it can be protected during transportation of the electrical connection box to a car manufacturer by being mounted in the container. Accordingly, the number of parts can be reduced by eliminating the need for the separate electronic unit container which is necessary with the prior art electrical connection box. Further, since the electronic unit is connected not at the vehicle assembly line, but during the assembling of the electrical connection box, an electrical connection check can be made for the assembled electrical connection box.

There may further be provided guide grooves which are formed in opposite inner surfaces of the electronic unit container with the respect to a direction normal to (or facing with) the opening and in which opposite edges of the circuit board are slidably fittable. The leading ends of the guide grooves at the opening are preferably tapered.

In this electrical connection box, a secure electrical connection can be ensured by positioning the circuit board in conformity with the guide grooves and inserting it along the guide grooves. Further, since the slanting surfaces are formed at the leading ends of the guide grooves at the opening, the circuit board can be inserted with an improved operability.

The lid preferably is formed with a through hole used for the connection with an external wiring harness. In this electrical connection box, the external wiring harness and the circuit board can be securely connected by permitting a connector which is connected with the circuit board and to be connected with the external wiring harness to project outward through the through hole formed in the lid.

BRIEF DESCRIPTION OF THE DRAWINGS

These and other objects, features and advantages of the present invention will become more apparent upon a reading of the following detailed description and accompanying drawings in which:

FIG. 16 is an exploded view of a prior art electrical connection box and a prior art electronic unit container.

DETAILED DESCRIPTION OF THE PREFERRED EMBODIMENTS

Figure 1:
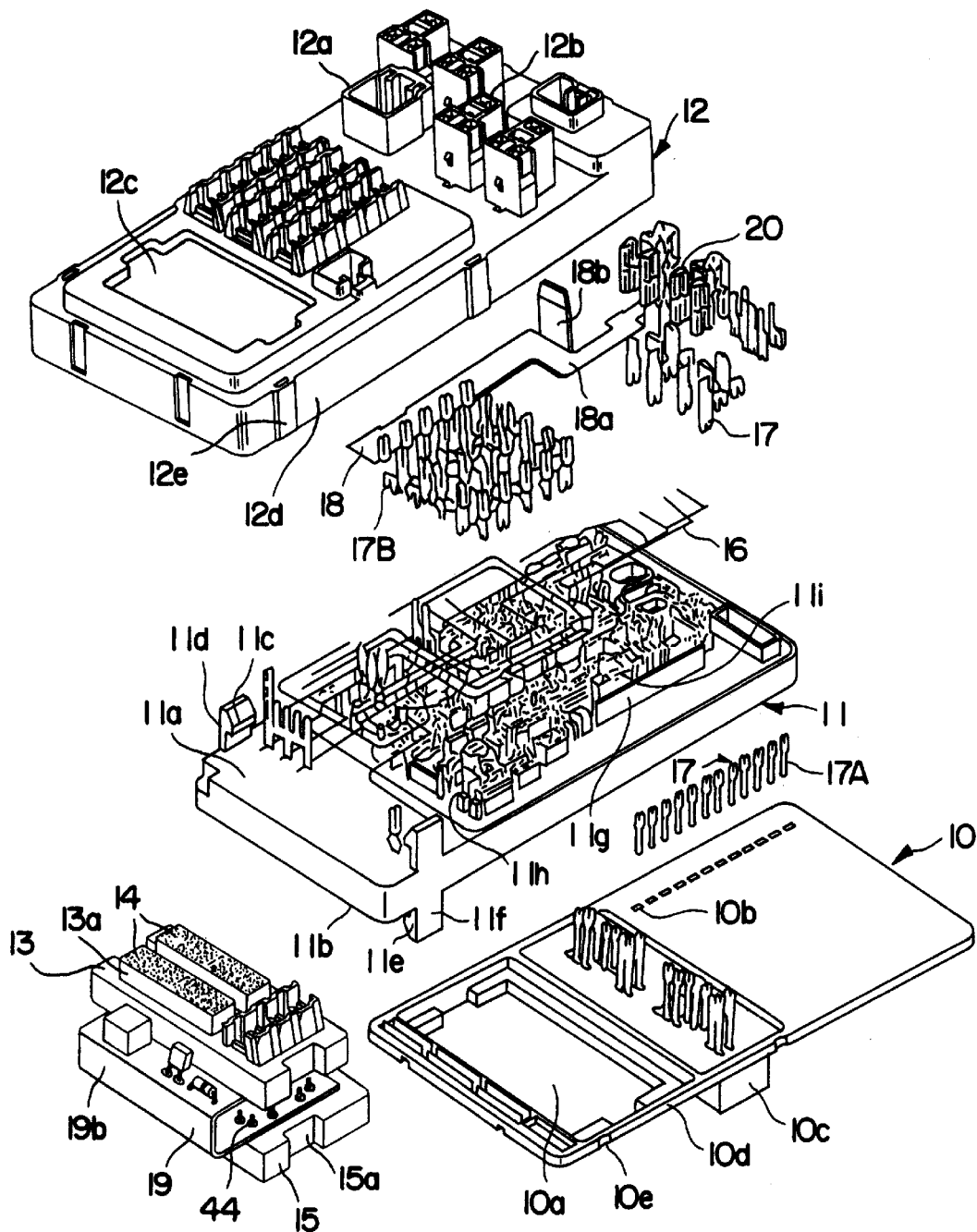
FIG. 1 is an exploded perspective view of one embodiment of an electrical connection box according to a first aspect of the invention.

An electrical connection box according to the invention includes a lower casing 10, an insulation plate 11 and an upper casing 12. A fuse box 13 is provided with a fuse fitting portion 13*a* to be fitted with a compact integrated fuse 14. A connector box 15 is provided with a small connector receptacle. Wires 16 are arranged on upper and lower surfaces of the insulation plate 11, and cramping terminals 17 are connected with the wires 16. A busbar 18 and a flexible printed circuit FPC 19 also are provided, as explained herein.

The lower casing 10 is formed at one side thereof (left side in FIG. 1) with an opening 10*a* into which the connector box 15 is fitted, and with terminal mount holes 10*b*. A connector receptacle 10*c* projects from the bottom surface of the lower casing 10.

The insulation plate 11 to be secured in the space defined by the lower and upper casings 10, 12 is provided with FPC mount portions 11*a*, 11*b* on upper and lower surfaces of its portion corresponding to the opening 10*a* of the lower casing 10. A fuse box locking portion 11*d* formed with a locking claw 11*c* projects at each of front and rear end portions of the FPC mount portion 11*a* on the upper surface of the insulation plate 11. Similarly, a connector box locking portion 11*f* formed with a locking claw 11*e* projects at each of front and rear end portions of the FPC mount portion 11*b* on the lower surface of the insulation plate 11.

Wire arrangement guides 11*g* project on the upper and lower surfaces of the insulation plate 11 excluding the FPC mount portions 11*a*, 11*b*. The wires 16 are arranged in recesses 11*h* defined by the wire arrangement guides 11*g*. With the wires 16 arranged on the lower surface of the insulation plate 11 are connected with cramping terminals 17A which project into the connector receptacle 10*c* through the terminal mount holes 10*b* of the lower casing 10. The connection of the cramping terminals 17A and the wires 16 may be made by connecting the cramping terminals 17A with the already arranged wires 16 and inserting them into the terminal mount holes 10*b* of the lower casing 10 or by connecting the wires 16 arranged on the insulation plate 11 with the cramping terminals 17A already inserted into the terminal mount holes 10*b*.

Cramping terminals 17B are connected with the wires 16 arranged on the upper surface of the insulation plate 11. External terminal connection portions provided at upper portions of the cramping terminals 17B are electrically connected with connectors and/or fuses to be fitted in connector receptacles 12*a* and a fuse receptacle 12*b* provided on the upper surface of the upper casing 12 directly or via intermediate terminals 20.

Most of the wires 16 arranged on the upper and lower surfaces of the insulation plate 11 are wires having a single core and a medium size diameter. Out of the circuits constructed by the wires 16, those having a current carrying capacity of about 5 A are constructed by thick wires and those having a current carrying capacity of about 1 A are constructed by thin wires.

The wire arrangement guides 11*g* provided on the insulation plate 11 to arrange the wires 16 along a circuit pattern have each a substantially flat upper surface 11*i* as shown in FIG. 1. The upper end surfaces 11*i* of the wire arrangement guides 11 are at the same height, and a substantially horizontal portion 18*a* of the busbar 18 is directly placed on the upper end surfaces 11*i*. By doing this, the wires 16 arranged in the recesses 11*h* defined by the wire arrangement guides 11*g* and the busbar 18 placed on the upper end surfaces 11*i* can be placed or arranged at two vertical stages or on vertically spaced planes or on different planes. It should be noted that the contact of the wires 16 and the busbar 18 does not cause any problem since only the insulation coatings of the wires 16 come into contact with the busbar 18. Parts of the busbar 18 are bent substantially upward to form tabs 18*b*. The tabs 18*b* are connected or connectable with a blade fuse (not shown) fitted into the fuse receptacle 12*b* or connectors fitted into the connector receptacles 12*a* directly or via intermediate terminals.

At one side of the upper casing 12, there is formed an opening 12*c* into which the compact integrated fuse 14 is fitted. At side walls 12*d* of the upper casing 12, there are formed lock portions 12e to be engaged with locking portions 10e of locking claws provided at side walls 10d of the lower casing 10.

Figure 2:
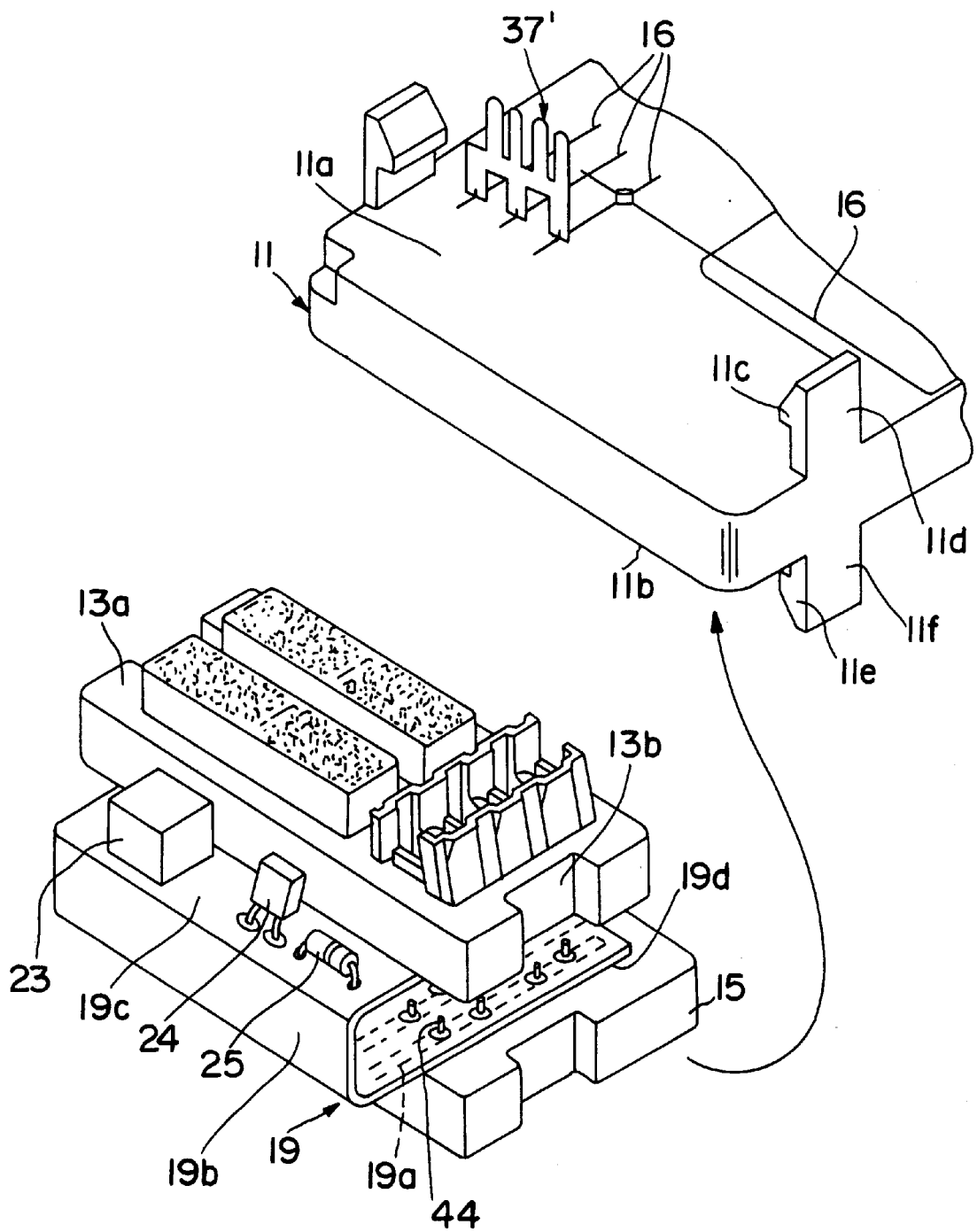
FIG. 2 is an enlarged perspective view of an essential portion of FIG. 1.

The FPC 19 which forms small current circuits is constructed such that conductive paths 19a e.g. made of metal foils or strips or wires are tightly held between lower and upper insulation films as shown in FIG. 2. The FPC 19 is folded or bent along a left end surface of the insulation plate 11 at its folding portion 19b in the center thereof so that one side portion (upper side portion) 19c thereof is placed on the FPC mount portion 11a on the upper surface of the insulation plate 11 and the other side portion (lower side portion) 19d thereof is placed on the FPC mount portion 11b on the lower surface of the insulation plate 11.

The fuse box 13 is placed on the upper surface of the upper side portion 19c of the FPC 19 which, in turn, has been placed on the upper surface of the insulation plate 11. At this time, the locking portions 11d of the insulation plate 11 are engaged with locking recesses 13b provided at the opposite sides of the fuse box 13, and the fuse box 13 is locked by the locking claws 11c. Similarly, the connector box 15 containing small connectors (not shown) is mounted on the lower surface of the lower side portion 19d of the FPC 19 on the lower surface of the insulation plate 11. At this time, the locking portions 11f of the insulation plate 11 are engaged with locking recesses 15a provided at the opposite sides of the connector box 15, and the connector box 15 is locked by the locking claws 11e.

Further, electronic devices such as a relay 23 for a circuit board, a noise filter 24 including a capacitor, and a diode 25 are mounted e.g. on the upper side portion 19c, and are electrically connected with the conductive paths 19a e.g. by soldering.

An upper portion of the fuse box 13 mounted on the upper surface of the upper side portion 19c projects through the opening 12c of the upper casing 12, and the compact integrated fuse 14 is inserted into the fuse fitting portion 13a formed at the upper surface of the fuse box 13 from above.

Figure 3:
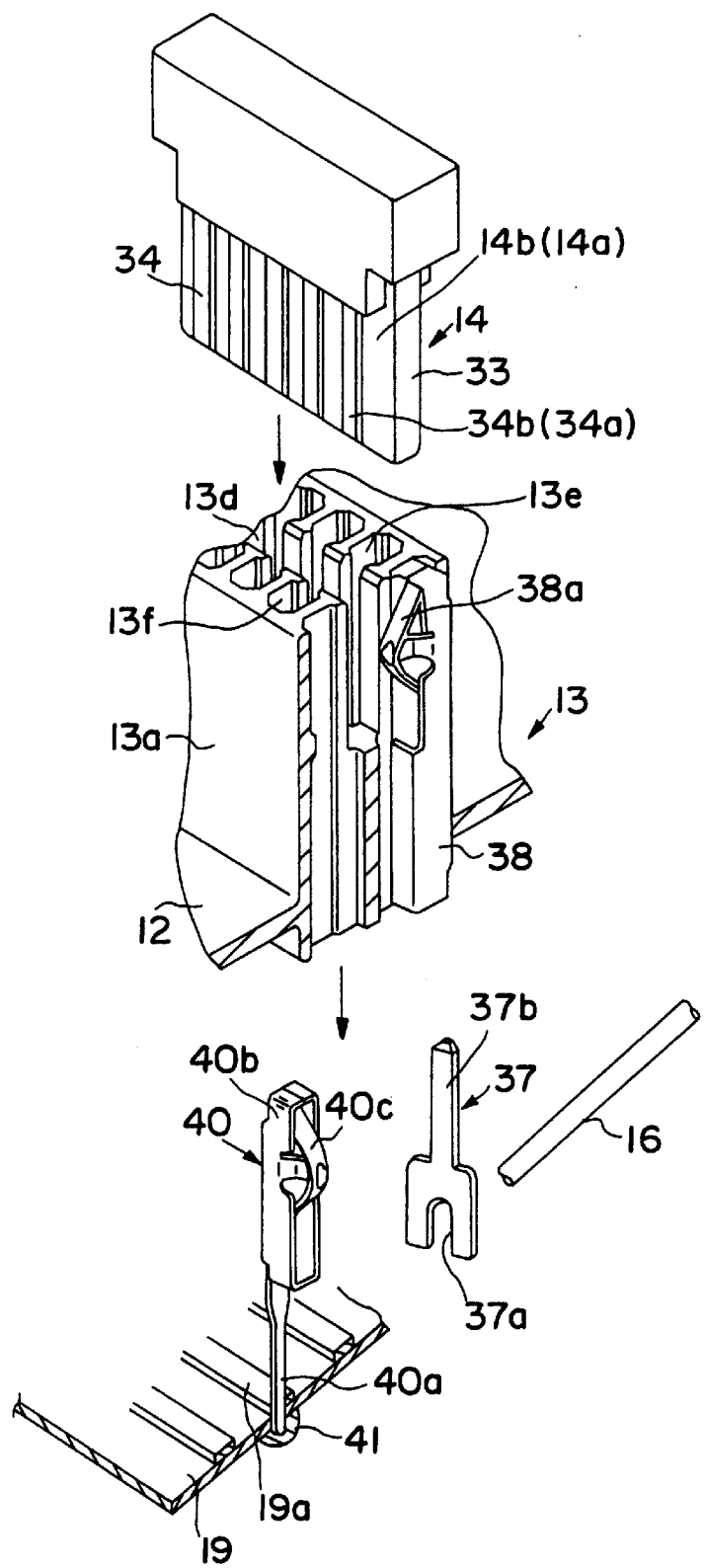
FIG. 3 is an exploded perspective view showing how a compact integrated fuse of FIG. 1 is connected with wires and an FPC.

As shown in FIG. 3, the integrated fuse 14 includes fusible elements 34 made of parallel strip-like conductive metal foils which are narrowly arranged such that they extend from one surface of an insulation plate 33 to the other surface thereof over an upper end thereof. The surfaces of the fusible elements 14 at the front surface of the insulation plate 33 are referred to as upstream (power source side) contact surfaces 14a, whereas the surfaces thereof at the rear surface of the insulation plate 33 are referred to as downstream (load side) contact surface 14b. The fuse fitting portion 13a into which the fuse 14 is inserted from above is formed at its upper end with an opening 13d into which the insulation plate 33 is insertable. In positions of the fuse fitting portion 13a at the opposite sides of the opening 13d which are to face the respective fusible members 34, there are formed recesses 13e, 13f for the engagement of the connection terminals.

Circuits to be connected with the upstream contact surfaces 34a of the fusible elements 34 of the fuse 14 are constructed e.g. by the wires 16, and the wires 16 and the upstream contact surfaces 34a are electrically connected via connection terminals each including a cramping terminal 37 and an intermediate terminal 38. Each cramping terminal 37 is formed at one end thereof with one slot 37a into which the wire 16 is pressed and at the other end thereof with at least one tab 37b. Each intermediate terminal 38 has such a substantially rectangular tubular shape that the tab 37b is insertable into the intermediate terminal 38 from its bottom end, and retained in contact with the inner wall of the intermediate terminal 38. A substantially triangularly projecting spring contact portion 38a is provided at an upper end of the intermediate terminal 38. The spring contact portion 38a is fitted or inserted into the recess 13e of the fuse fitting portion 13a, thereby being pressed against the upstream contact surface 34a of the corresponding fusible element 34 to establish an electrical contact. A cramping terminal 37' having a plurality of slots and a plurality of tabs as shown in FIG. 2 may be connected with the wires 16, and the intermediate terminals 38 may be fitted to the respective tabs of the cramping terminal 37' so as to be connected with the fuse 14.

Circuits to be connected with one or more downstream contact surfaces 34b of the fusible elements 34 of the fuse 14 are constructed by or comprise conductive paths 19a of the FPC 19, and the conductive paths 19a and the downstream contact surfaces 34b are electrically connected via connection terminals 40. Each connection terminal 40 has an electrical connection portion 40a in the form of a long and narrow plate, in particular having a needle-like leading end and projecting from the bottom end. The electrical connection portion 40a is pierced or inserted through the conductive path 19a of the FPC 19 and secured by solder 41. On the other hand, a bent or closed or bottomed tubular portion 40b is provided at an upper part of the connection terminal 40, and a projecting, in particularly triangularly shaped, spring contact portion 40c projects toward one side from the inside of the tubular portion 40b. Further, a locking portion (not shown) projecting in a direction opposite to the projection direction of the contact portion 40c is provided at the opposite side of the tubular portion 40b. The contact portion 40c is fitted and locked in the corresponding recess 13f of the fuse fitting portion 13a, thereby being pressed against the downstream contact surface 34b of the corresponding fusible element 34 to establish an electrical connection.

After the intermediate terminals 38 are connected with the wires 16 via the cramping terminals 37, and the connection terminals 40 are inserted into the fuse fitting portion 13a, the fuse 14 is inserted or insertable for the connection.

The conductive paths 19a at the upper side portion 19b are connected with the downstream sides of the respective fusible elements 34 of the integrated fuse 14 as described above, and extend to the lower side portion 19d of the FPC 19 via the folded portion 19b. At the lower surface of the insulation plate 11, connection terminals 44 each having one end thereof connected with the corresponding conductive path 19a by soldering are located in connector receptacles of the connector box 15. The connector box 15 projects downward through the opening 10a of the lower casing 10, thereby enabling connectors to be detachably fitted in the connector receptacles from outside.

Since the narrowly arranged and substantially parallel fusible elements 34 of the integrated fuse 14 are connected with the connection terminals connected with the wires 16 and those connected with the FPC 19, the intervals of the internal circuits of the electrical connection box can be matched with the small intervals of the fusible elements 34.

The above electrical connection box is constructed as follows. In the casing comprised of the upper and lower casings 10, 12, the wires 16 for constructing medium current circuits are first arranged between the lower casing 10 and the insulation plate 11, and the external terminal connection portions of the cramping terminals 17A connected with the wires 16 are caused to project from the terminal mount holes 10b of the lower casing 10 so as to be connectable with the external terminals. The wires 16 also are arranged on the upper surface of the insulation plate 11, and the cramping terminals 17B are connected with the wires 16 in specified positions. The external terminal connection portions of the cramping terminals 17B connected with the wires 16 are caused to project from the terminal mount holes of the upper casing 12 so as to be connectable with the external terminals. The busbar 18 is placed on the upper end surfaces 11i of the wire arrangement guides 11g on the upper surface of the insulation plate 11, and the substantially upwardly bent tabs 18b of the busbar 18 are caused to project through mount holes formed in the upper casing 12 so as to be connectable with the external terminals.

The folded FPC 19 is placed on the upper and lower surfaces of the one side of the insulation plate 11. By mounting the integrated fuse 14 on the fuse box 13 placed on the upper surface of the FPC 19, the upstream and downstream sides of the integrated fuse 14 are connected with the wires 16 and the FPC 19, respectively. At the lower surface of the insulation plate 11, each of the connection terminals 44 has one end thereof connected with the FPC 19 connected with the downstream side of the integrated fuse 14 and the other end thereof located in the connector receptacle of the connector box so as to be connectable with the external terminal.

Figure 4:
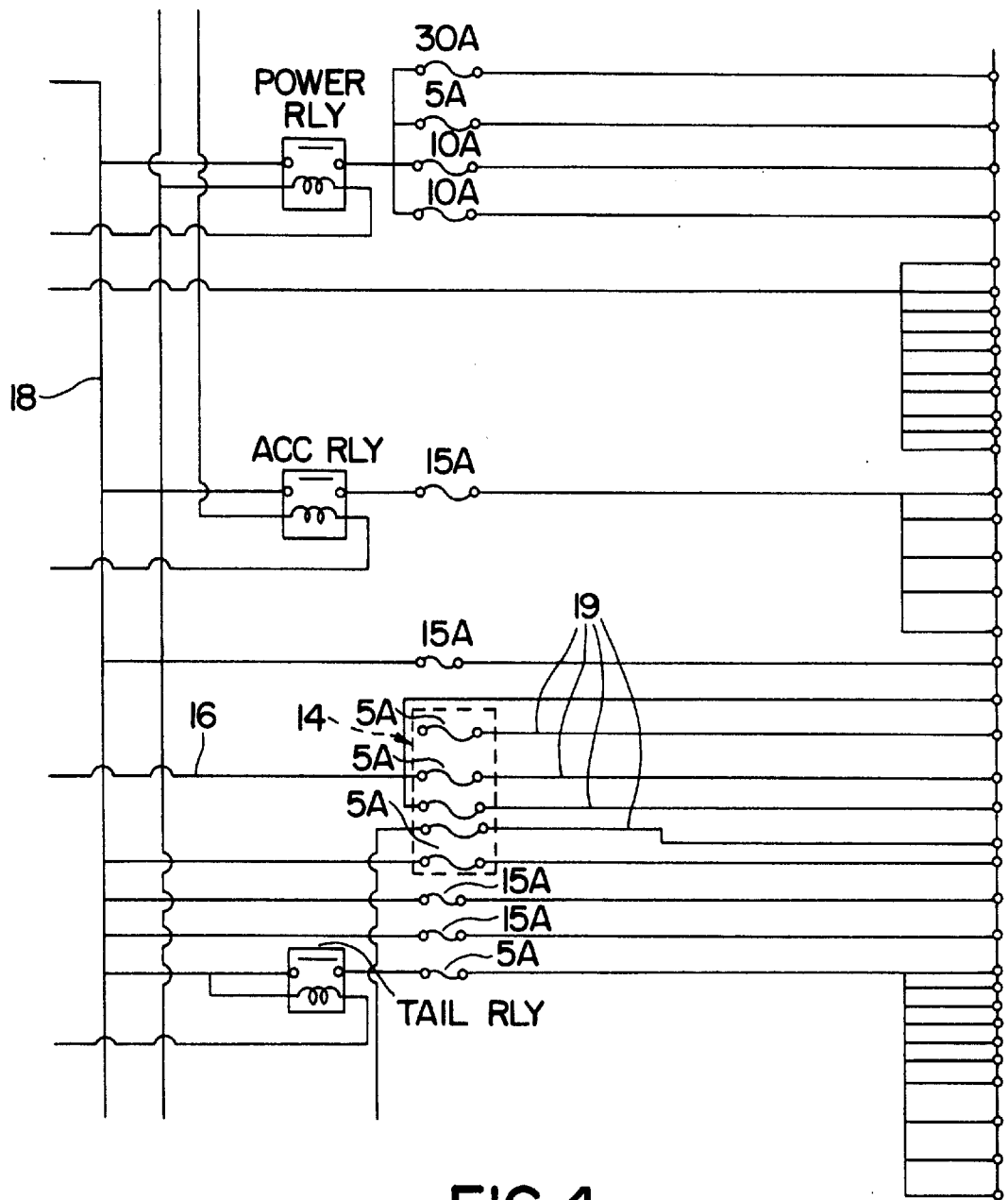
FIG. 4 is a circuit diagram of parts of internal circuits of the electrical connection box of FIG. 1.
Figure 5:
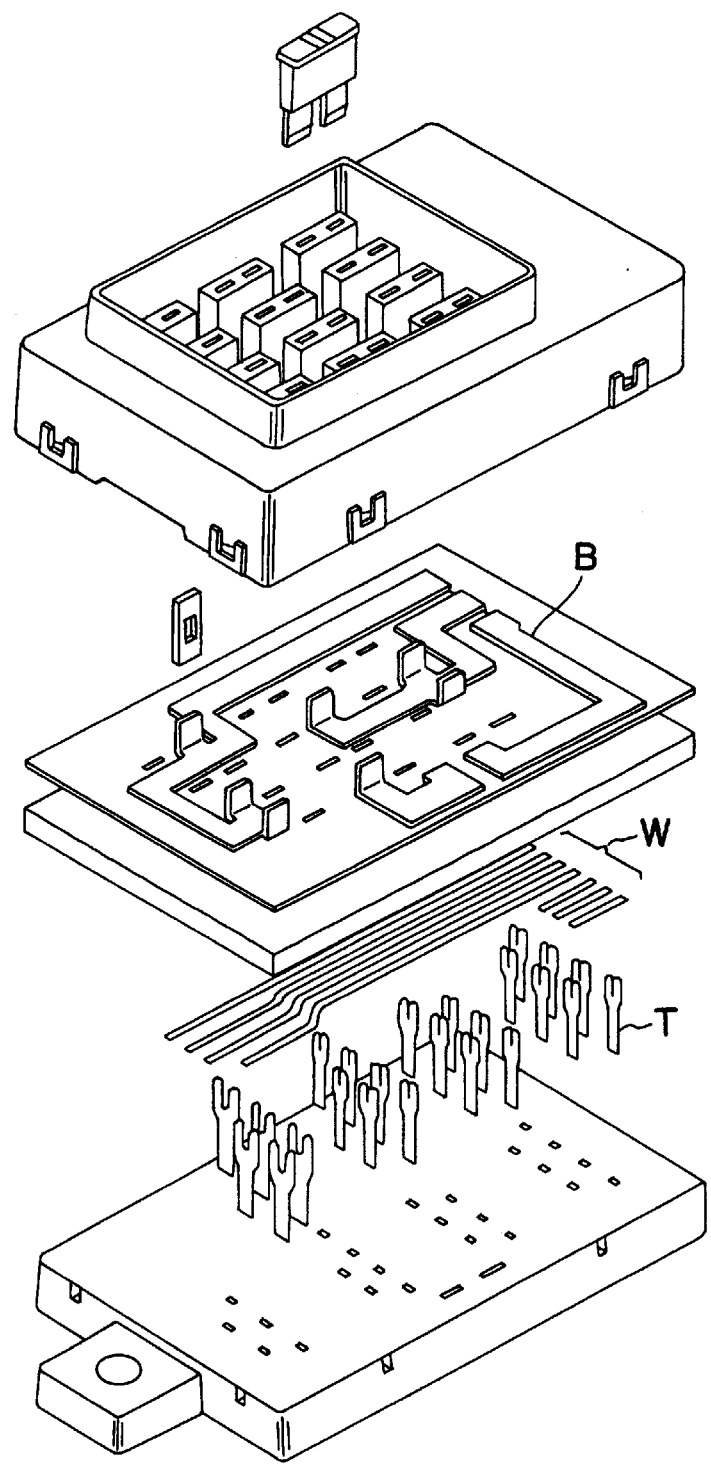
FIG. 5 is an exploded perspective view of a prior art electrical connection box.
Figure 6A:
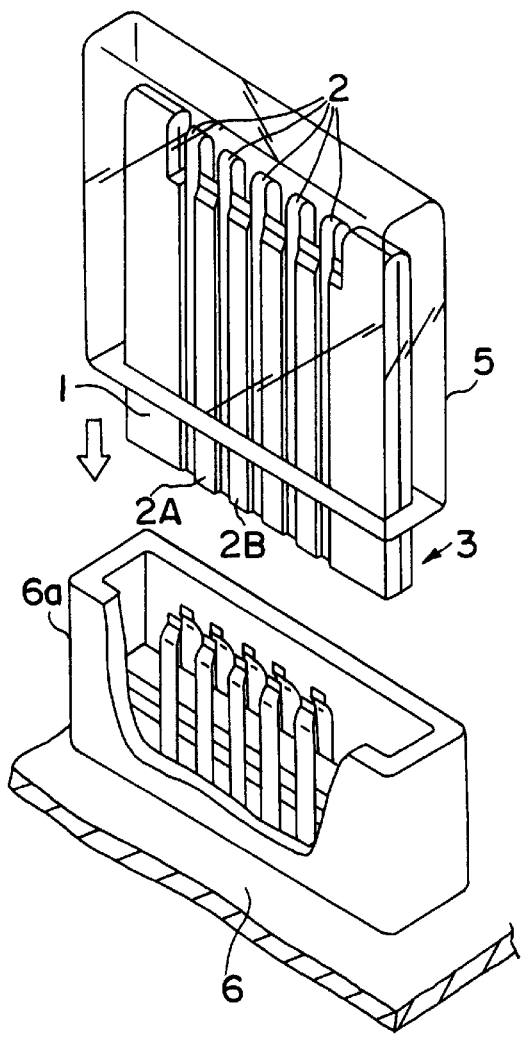
FIGS. 6A and 6B are perspective views of the compact integrated fuse.
Figure 6B:
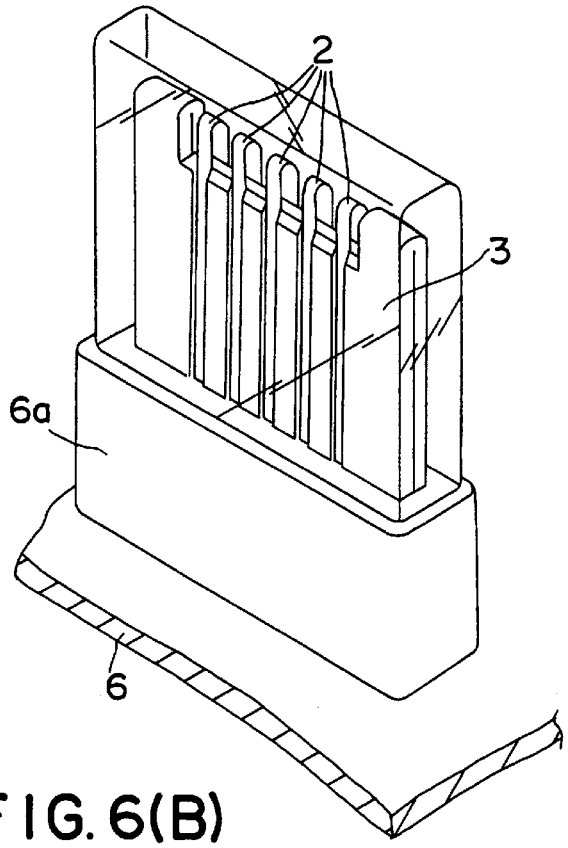

The combination and connection of the large current circuits constructed by the busbars 18, the medium current circuits constructed by the wires 16 and the cramping terminals 17, and the small current circuits constructed by the FPC 19 are as shown in FIG. 4. In FIG. 4, bold lines, normal lines and thin lines represent the large current circuits constructed by the busbar 18, the medium current circuits constructed by the wires 16 and the cramping terminals 17, and the small current circuits constructed by the FPC 19, respectively. Further, in FIG. 4, the integrated fuse 14 is indicated by broken line in order to clearly show the connection of the wires 16 and the FPC 19 via the integrated fuse 14.

Thus, according to the invention, in the large electrical connection box, such as a junction block, the busbar 18 for constructing the large current circuits, the wires 16 and the cramping terminals 17 for constructing the medium current circuits and the FPC 19 for constructing the small current circuits are accommodated in the casing comprised of the lower casing 10 and the upper casing 12 while being suitably combined, realizing a compact arrangement. Accordingly, the electrical connection box can be made smaller. Further, since the intervals of the internal circuits of the electrical connection box can be matched with those of the narrowly arranged parallel fusible elements 34 of the integrated fuse 14, the mounting of the integrated fuse 14 which has been difficult in the past can be made possible.

The present invention is not limited to the foregoing embodiment. For example, the conductive paths 19a of the FPC 19 may not necessarily be connected with the downstream side of the integrated fuse 14, but may be connected with the wires 16 without being connected with the fuse 14. Further, the connection terminals connected with the wires 16 for the connection of the wires 16 and the fuse 14 may each be provided with a spring contact portion, thereby obviating the need for the intermediate terminals. Furthermore, both upstream and downstream sides of the integrated fuse 14 may be connected with the FPCS.

Figure 7:
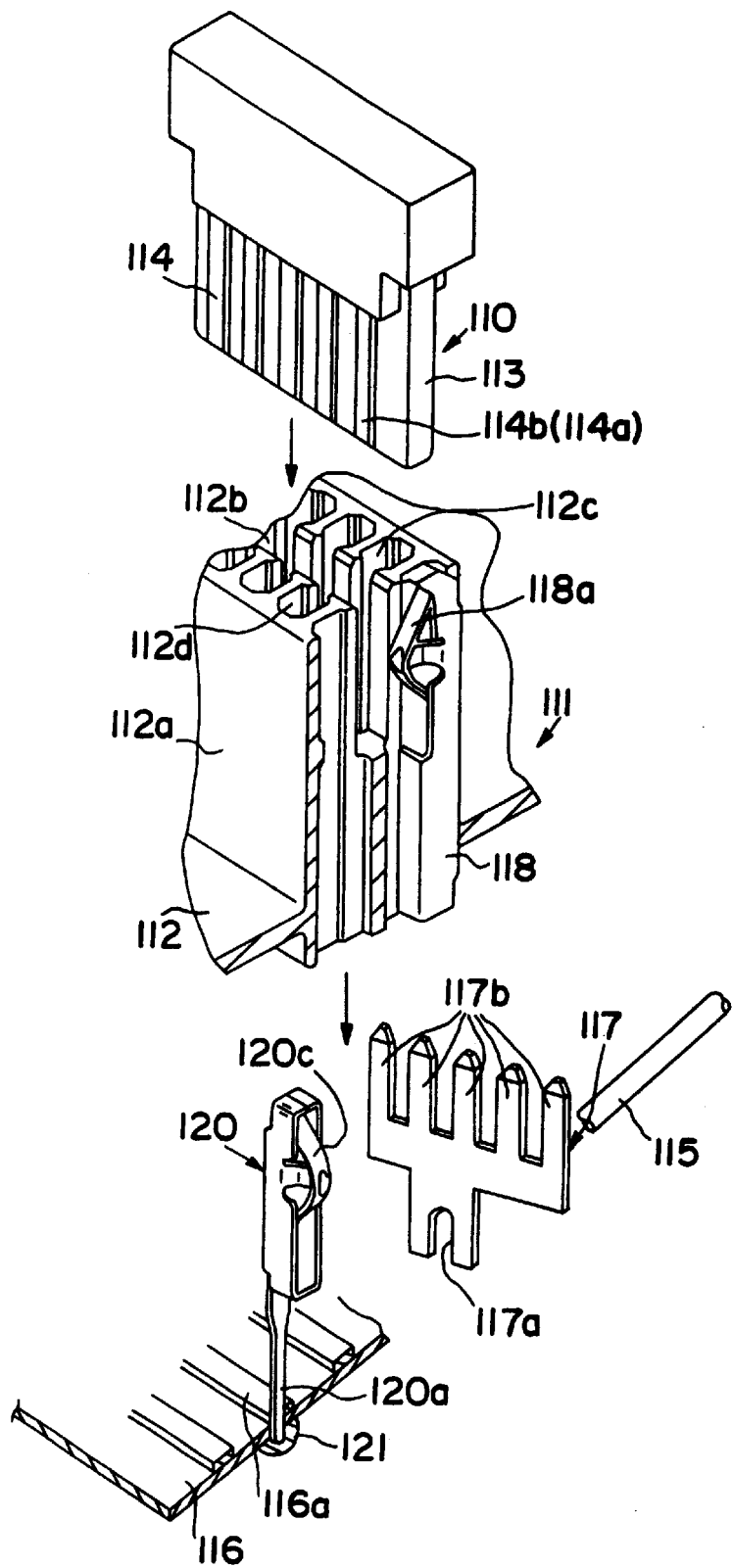
FIG. 7 is an exploded perspective view of a first embodiment of the second aspect of the invention.

FIG. 7 shows a compact integrated fuse 114 (hereinafter, "fuse 110") which is identical to the fuse 14 described above and shown in FIG. 3. A fuse fitting portion 112a to which the fuse 110 is detachably fitted from above is provided at an upper casing 112 of an electrical connection box 111, in a similar manner to the comparable structures in FIG. 3. A connection terminal 120 is substantially identical to the terminal 40 in FIG. 3. The connection terminal 120 is connected with an internal circuit of the electrical connection box and is insertable into the fuse fitting portion 112a, in particular from below.

Fusible elements 114 made of e.g. strip-like conductive metal foils and/or wires or the like are narrowly and substantially parallelly arranged such that they extend from one surface of an insulation plate 113 of the fuse 110 to the other surface thereof over an upper end thereof. The surfaces of the fusible elements 114 at the front surface of the insulation plate 113 are referred to as upstream (power source side) contact surfaces 114a, whereas the surfaces thereof at the rear surface of the insulation plate 113 are referred to as downstream (load side) contact surface 114b. The fuse fitting portion 112a into which the fuse 110 is inserted from above is formed at its upper end with an opening 112b into which the insulation plate 113 is insertable. In positions of the fuse fitting portion 112a at the opposite sides of the opening 112b which are to face the respective fusible members 114, there are formed recesses 112c, 112d for the engagement of the connection terminals.

Wires 115 and a flexible printed circuit FPC 116 which construct internal circuits are accommodated in a casing of the electrical connection box 111. This casing is comprised of an upper casing 112 and a lower casing (not shown). The wires 115 may be arranged in wire arrangement grooves formed in the inner surface of the upper casing 112 or formed in an insulation plate accommodated in the casing. Cramping terminals (not shown) are connected with the wires 115 in desired positions to connect the wires 115 with external terminals.

Circuits to be connected with the upstream contact surfaces 114a of the fusible elements 114 of the fuse 110 are comprised or constructed by the wires 115, and the wires 115 and the upstream contact surfaces 114a are electrically connected via connection terminals each including a cramping terminal 117 and an intermediate terminal 118. Each cramping terminal 117 is formed at one end thereof with one slot 117a similar to the slot 37a of the cramping terminals 37 shown in FIG. 3 and into which the wire 115 is pressed or pressable. At the other end thereof one or more tabs 117b are spaced at specified intervals. The slot 117a may be arranged at an angle different from 0° or 180° with respect to the tabs 117b, in particular substantially normal thereto. The intermediate terminals 118 have such a substantially rectangular tubular shape that the tabs 117b are insertable into the intermediate terminals 118 from their bottom ends, and are retained in contact with the inner walls of the intermediate terminals 118. A triangularly projecting spring contact portion 118a is provided at an upper end of each intermediate terminal 118. The spring contact portion 118a is fitted or fittable into the recess 112c of the fuse fitting portion 112a, thereby being pressed against the upstream contact surface 114a of the corresponding fusible element 114 to establish an electrical contact.

Figures 8A, 8B:
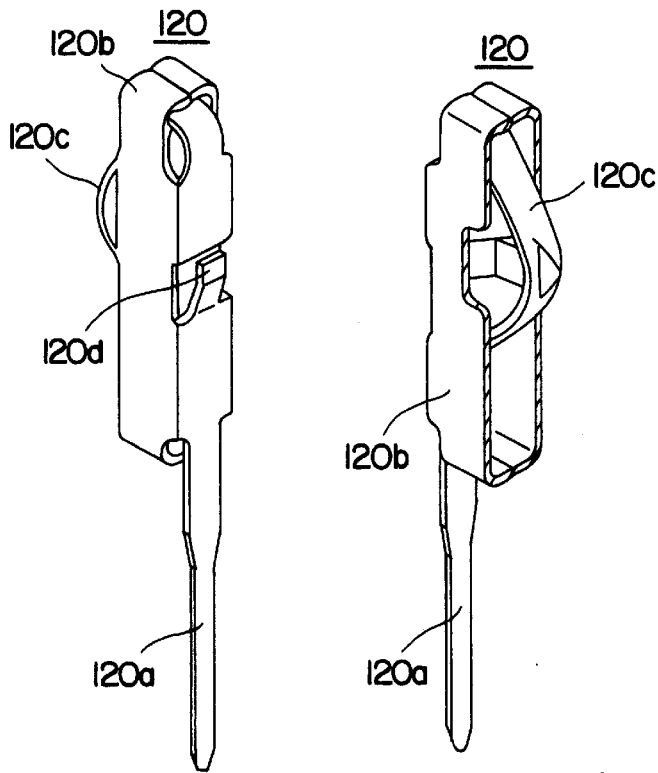
FIGS. 8(A), 8(B) and 8(C) are a perspective view and perspective views partly in section of a connection terminal 120 used in the first embodiment, respectively.
Figure 8C:
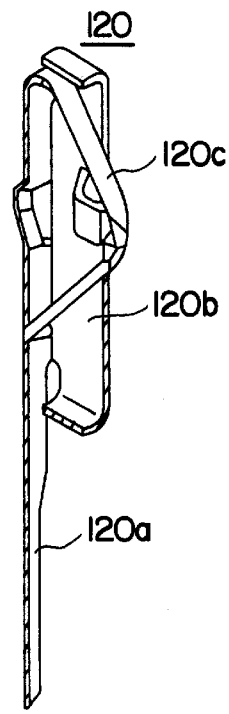

Circuits to be connected with the downstream contact surfaces 114b of the fusible elements 114 of the fuse 110 are constructed by conductive paths 116a of the FPC 116, and the conductive paths 116a and the downstream contact surfaces 114b are electrically connected via connection terminals 120. Each connection terminal 120 has an electrical connection portion 120a in the form of a long and narrow plate having a needle-like leading end and projecting from the bottom end as shown in FIGS. 8(A), 8(B) and 8(C). The electrical connection portion 120a is pierced through or inserted in the conductive path 116a of the FPC 116 and secured by solder 121. On the other hand, a bent or bottomed tubular portion 120b is provided at an upper part of the connection terminal 120, and a projecting, in particular triangularly shaped, spring contact portion 120c projects toward one side from substantially the inside of the tubular portion 120b. Further, a locking portion 120d projecting in a direction substantially opposite to the projection direction of the contact portion 120c is provided at the opposite side of the tubular portion 120b. The contact portion 120c is fitted or fittable and lockable in the corresponding recess 112d of the fuse fitting portion 112a, thereby being pressed against the downstream contact surface 114b of the corresponding fusible element 114 to establish an electrical connection.

After the intermediate terminals 118 are connected with the wires 115 via the cramping terminals 117, and the connection terminals 120 are inserted into the fuse fitting portion 112a, the fuse 110 is inserted for the connection.

In order to prevent the solder 121 from flowing into the recesses 112c into which the intermediate terminals 118 are inserted when the connection terminals 120 are connected with the conductive paths 116a by the solder 121, soldering is performed using a device (not shown) for closing the openings at the bottom ends of the recesses 112c.

Figure 9A:
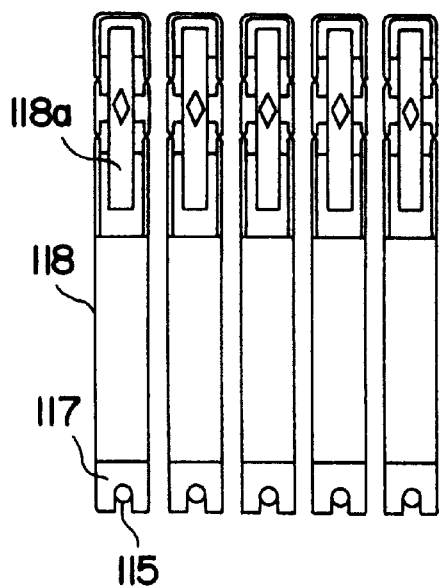
FIG. 9(A) is a side view showing cramping terminals and intermediate terminals connected with wires according to the first embodiment.
Figure 9B:
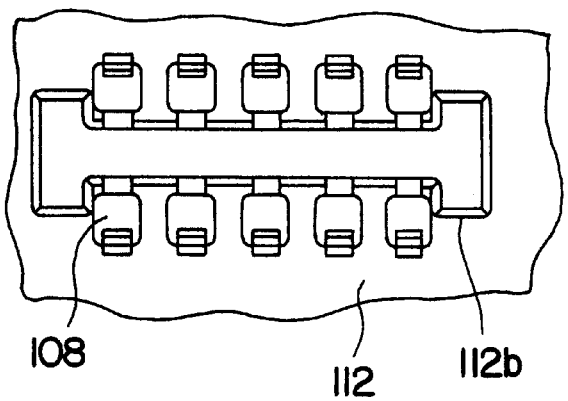
FIG. 9(B) is a plan view showing the intermediate terminals in their mount positions.

If the circuits to be connected with the parallel narrowly spaced fusible elements 114 of the fuse 110 are substantially constructed by the wires 115 and the FPC 116 as described above, the connection terminals can be connected with the wires 115 and the FPC 116 at the same small intervals or pitches as the fusible elements 114, thereby matching the intervals or pitches of the connection terminals and those of the fusible elements. More specifically, as shown in FIGS. 9(A) and 9(B), by connecting the cramping terminals 117 with a multitude of wires 115 arranged in parallel and connecting the intermediate terminals 118 with a plurality of tabs 117b of the cramping terminals 117, the spring contact portions 118a of the intermediate terminals 118 can be spaced by the same distance as the fusible elements 114 of the fuse 110.

Figure 10:
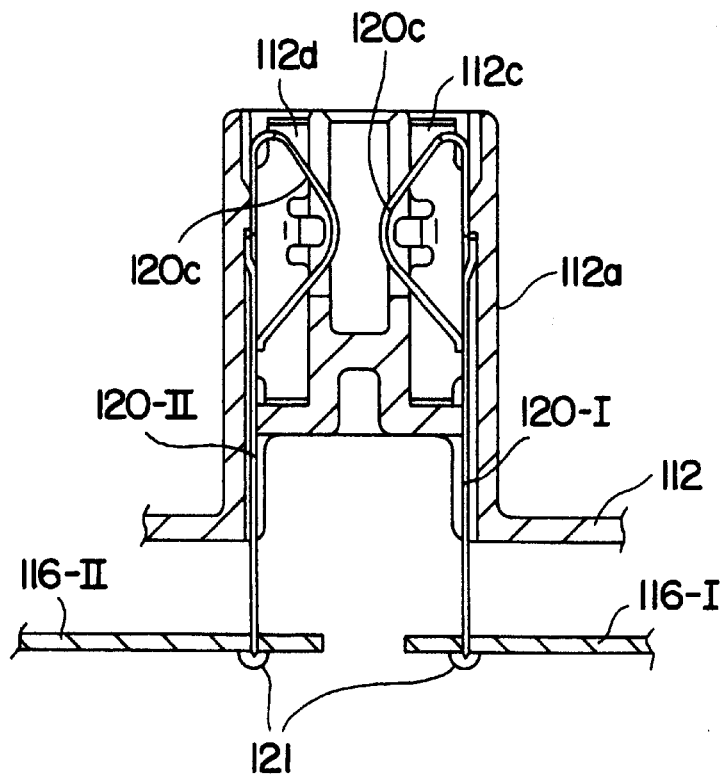
FIG. 10 is a section of a second embodiment.

FIG. 10 shows a second embodiment wherein the internal circuits of the electrical connection box to be connected at the upstream and downstream sides of the fuse are both constructed by FPCs 116-I and 116-II, respectively. More specifically, connection terminals 120-I, 120-II at one end are secured to conductive paths of the FPCs 116-I, 116-II by solder 121, and spring contact portions 120c are caused to project substantially toward each other to be pressed against upstream and downstream contact surfaces of the fuse (not shown in FIG. 10). If the FPCs are connected with both upstream and downstream sides of the fuse, the conductive paths of the upstream side FPC 116-I are thicker and/or wider than those of the downstream side FPC 116-II to allow a flow of a large current. Furthermore one upstream-side FPC 16-I may thus be distributed over a plurality of electrical portions 120a, which are connected with one another, to a plurality of downstream side FPC 116-II. Thus, even if the circuits to be connected with the upstream and downstream sides of the fuse are both constructed by the FPCs, the connection terminals can be arranged at the same intervals as the narrowly spaced fusible elements of the fuse.

Although the circuits to be connected with the upstream and downstream sides of the fuse are both constructed by the FPCs in the second embodiment, both circuits may be constructed by wires. In such a case, the cramping terminals 117 shown in FIG. 7 may be connected with both wires upstream and downstream from the fuse, and the intermediate terminals 118 may be connected with the cramping terminals 117 and fitted into both recesses 112c and 112d of the fuse fitting portion 112a. Thus, even if the circuits to be connected with the upstream and downstream sides of the fuse are constructed by the wires, the intermediate terminals 118 can be mounted at small intervals, thereby matching the intervals of the intermediate terminals 118 and those of the fusible elements of the fuse.

Figure 11:
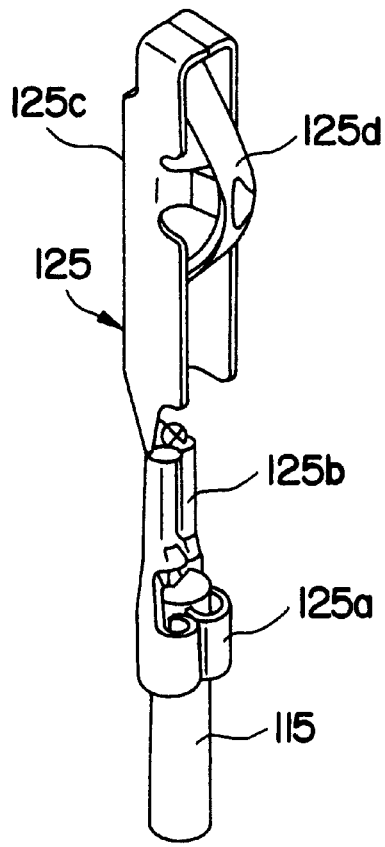
FIG. 11 is a perspective view of another embodiment of the connection terminal for connecting the wire and a fuse.
Figure 12:
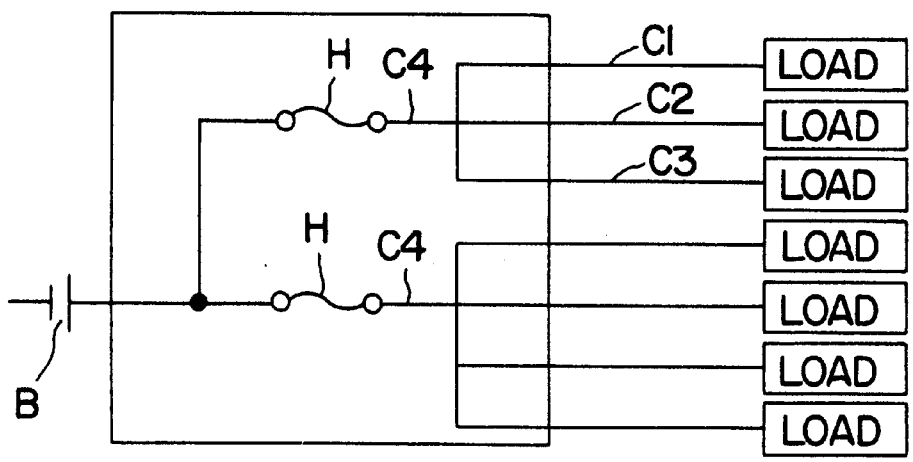
FIG. 12 is a block diagram of a prior art circuit protection system.
Figure 13:
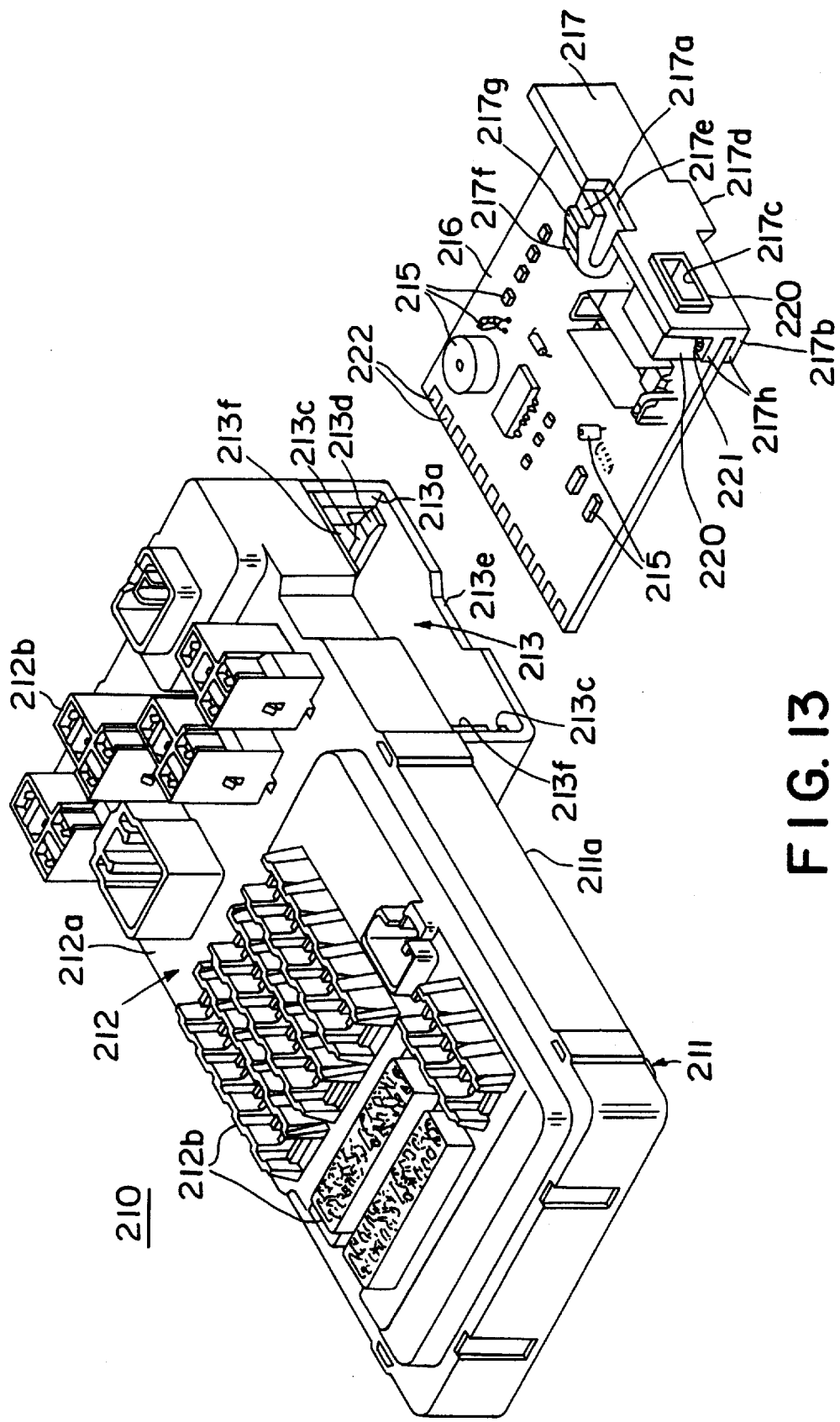
FIG. 13 is a perspective view showing a state where a circuit board carrying electronic devices are to be inserted into an electrical connection box according to a third aspect of the invention.
Figure 14:
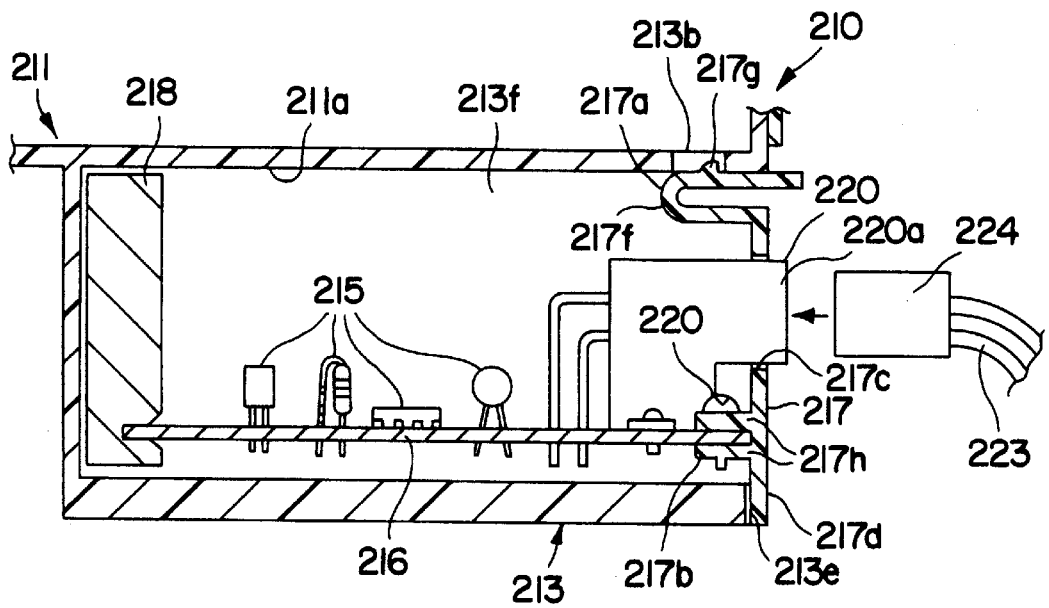
FIG. 14 is section of the electrical connection box mounted with the circuit board.

The connection of the wire and the fusible element is not limited to the one made by a combination of the cramping terminal 117 and the intermediate terminal 118 as shown in FIG. 7. A single connection terminal 125 having in particular a cramping portion at its part to be connected with the wire 115 as shown in FIG. 11 may be used for the connection. The connection terminal 125 has an insulation coating barrel 125a and a core barrel 125b at one end, and a substantially rectangular bottomed tubular portion 125c similar to the connection terminal 120 at the other end. A triangularly shaped spring contact portion 125d is provided at the substantially rectangular tubular portion 125c. An electrical connection is established by inserting and locking the rectangular tubular portion 125c in the recess of the fuse fitting portion and pressing the spring contact portion 125c against the contact surface of the fusible element.

The use of the single part connection terminal 125 instead of the two part connection terminal including the cramping terminal and the intermediate terminal reduces the number of parts and a labor required for the connection.

As is clear from the above description, the internal circuits of the electrical connection box to be connected with the upstream side of the compact integrated fuse are constructed by the wires, and those to be connected with the downstream side thereof are constructed by the FPC. Accordingly, the connection terminals can be mounted at the same intervals as the parallel narrowly arranged fusible elements of the integrated fuse, thereby matching the intervals of the connection terminals and those of the fusible elements.

Since both upstream and downstream side circuits are constructed by wires or by FPCs, the connection terminals can be, in each case, mounted at the same intervals as the parallel narrowly arranged fusible elements of the integrated fuse, thereby matching the intervals of the connection terminals and those of the fusible elements.

If the wires and the FPCs are used as described above, the problem in the busbar forming process using a large press can be avoided; the compact integrated fuse can be mounted in the electrical connection box; and the electrical connection box can be made smaller and denser.

Another embodiment of an electrical connection box 210 for an automotive vehicle according to the invention is shown in FIGS. 13–16 and includes lower and upper casings 211, 212 of synthetic resin which are fittable to each other. A box-shaped electronic unit container 213 having an opening 213a in one side surface is integrally or unitarily formed at a portion of an outer surface 211a of the bottom wall of the lower casing 211.

Into the electronic unit container 213 is inserted a circuit board 216 carrying electric and/or electronic devices 215 such as diodes and capacitors with a lid 217 detachably mounted on one end thereof until the opening 213a of the container 213 is substantially closed by the lid 217. In this state, the electrical connection box 210 is shipped to a car manufacturer or the like.

The electronic unit container 213 is formed particularly in its ceiling surface with an engaging portion 213b including a locking hole which is engaged and secured with a locking portion 217a formed at the lid 217. Further, opposite inner surfaces 213f being arranged in a direction at an angle different from 0° or 180°, particularly normal with respect to the opening 213a of the container 213 therebetween project inward from a position retracted from the edge of the opening 213a by the thickness of the lid 217, and guide grooves 213c into which guide portions, in particular the opposite edges of the circuit board 216 are slidably fittable are formed in the inner surfaces 213f. The leading ends of the guide grooves 213c at the opening 213a are tapered to form slanting surfaces 213d. Further, a positioning notch 213e is formed substantially in the middle of the bottom edge of the opening 213a.

Figure 15:
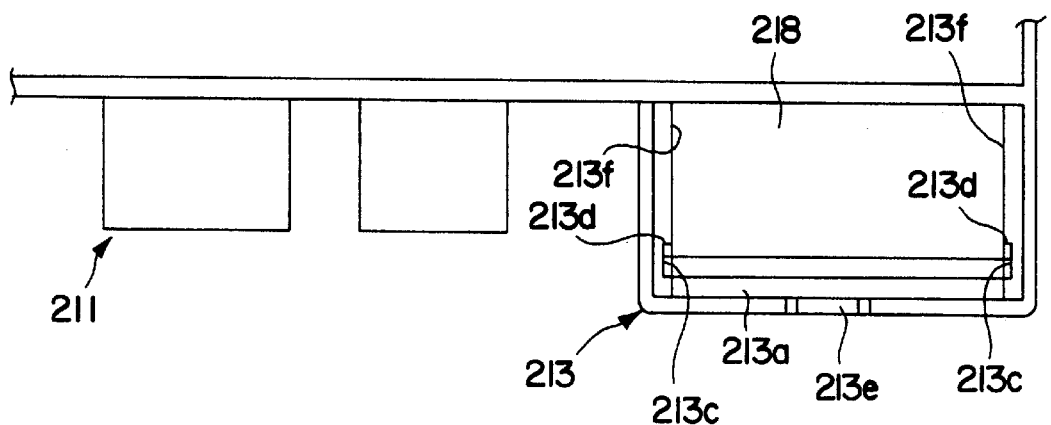
FIG. 15 is a side view of an electronic unit container formed at a lower casing of the electrical connection box.

At a closed side of the electronic unit container 213 opposite from the opening 213a, a connection means, in particular a housing 218 is mounted which accommodates connection terminals (not shown) for electrically connecting internal circuits of the electrical connection box 210 and the circuit board 216. The circuit 216 and the housing 218 can be connected as shown in FIG. 15 only by positioning electrical connection portions of the connection terminals in conformity with the guide grooves 213c and inserting the circuit board 216 along the guide grooves 213c.

The lid 217 is formed such that it is fitted in the opening 213a of the electronic unit container 213 and its outer surface is preferably substantially in flush with the edge of the opening 213a, and includes the locking portion 217a engageable with the engaging portion 213b and a mount portion 217b for replaceably fixing the circuit board 216. Further, the lid 217 is formed with a through hole 217c through which a connector 220 mounted on the circuit board 216 and to be connected with an external wiring harness projects or can project outward. The lid 217 is also formed in the substantially middle of its bottom with a projection 217d engageable with or insertable into the positioning notch 213e. The through hole 217c is not formed in the case that the connector 220 for the connection with the external wiring harness is not connected with the circuit board 216. The through hole 217c may be closed by a cover (not shown), which is integrally or unitarily formed with the lid 217 and has one or more depressions or recesses substantially around its periphery. The cover may be broken out or eliminated in case (or when) the connector 220 is mounted or is to be mounted on the circuit board 216.

The locking portion 217a includes a substantially U-shaped elastic portion 217f projecting from the inner surface of the bottom edge of a notch 217e formed substantially in the middle of the upper edge of the lid 217, and a locking claw 217g projecting upward from the leading end of the elastic portion 217f.

The mount portion 217b includes a pair of holding plates 217h projecting from the inner surface of the lid 217 in such positions in conformity with the guide grooves 213c and extending substantially over the width of the lid 217. The circuit board 216 is fixed by inserting a portion thereof into the clearance between the holding plates 217h and fastening screws 221. A mount construction of the circuit board 216 and the lid 217 is not limited to the above, but may be engageable projection and recess formed on the circuit board 216 and the lid 217. Similar to the prior art, the circuit board 216 is provided with printed circuits on its upper and lower surfaces (not shown), and is replaceably mounted on the lid 217 in conformity with the type and grade of the vehicle. The electronic devices 215 such as diodes and capacitors mounted on the circuit board 216 are connected with the printed circuits, and connection portions 222 at the leading ends of the printed circuits are connected with the connection terminals accommodated in the housing 218. In this embodiment, the connector 220 to be connected with a connector 224 of an external wiring harness 223 is connected with the circuit board 216, and a fitting portion 220a of the connector 220 is permitted to project outside through the through hole 217c of the lid 217.

The electrical connection box 210 having a built-in electronic unit is assembled as follows. First, the upper casing 212 formed on its outer surface with receptacles 212b for fuses, relays and other devices is fitted to the lower casing 211.

Subsequently, a circuit board 216 carrying electronic devices 215 in conformity with the type and grade of the vehicle is selected and mounted on the mount portion 217b of the lid 217 by fastening the screws 221. In this state, the fitting portion 220a of the connector 220 for the connection with the external wiring harness projects outside through the through hole 217c of the lid 217.

Subsequently, the circuit board 216 is so positioned as to conform to the guide grooves 213c of the electronic unit container formed at the lower casing 211, and is inserted into the container 213 along the guide grooves 213c. At this time, the insertion can be done with an improved operability since the tapered slanting surfaces 213d are formed at the leading ends of the guide grooves 213c.

Upon the insertion of the circuit board 216, the connection portions of the circuit board 216 are connected with the connection terminals of the housing 218 mounted in the electronic unit container 213. Simultaneously, the locking portion 217a of the lid 217 is engaged with the engaging portion 213b and the opening 213a of the container 213 is closed by the lid 217, thereby completing the assembly of the electrical connection box 210. The upper casing may be fitted to the lower casing 211 after the circuit board 216 mounted on the lid 217 is inserted into the electronic unit container 213.

When the opening 213a of the electronic unit container 213 is closed by the lid 217, the outer surface of the lid 217 is in flush with the opening edge of the container 213. More specifically, if they are not in flush, e.g. the lid 217 projects from the container 213, an operator can see that the circuit board 216 is not properly inserted or connected.

In the electrical connection box 210, since the circuit board 216 carrying the electronic devices 215 is detachably insertable into the electronic unit container 213 integrally or uniformly formed with the lower casing 211, it can be protected during transportation by shipping the electrical connection box 210 with the circuit board 216 mounted in the container 213. Accordingly, unlike the prior art, the electronic unit container separate from the electrical connection box is not necessary. Thus, the number of parts can be reduced; a production cost can be reduced; and a transportation cost can also be reduced because a one-piece electrical connection box can be shipped to the car manufacturer.

Further, since the circuit board 216 is connected not at the vehicle assembly line, but during the assembly of the electrical connection box 210, an electrical connection check can be made for the assembled electrical connection box 210. Therefore, the reliability of the electrical connection box 210 can be improved by eliminating a defective engagement or connection. As is clear from the above description, in the electrical connection box according to this latter embodiment, the circuit board carrying specified electronic devices in conformity with the type and grade of the vehicle is selected, replaceably mounted on the lid, and detachably mounted in the electronic unit container integrally or uniformly formed at the lower casing. Accordingly, the circuit board carrying the electronic devices can be protected during transportation to the car manufacturer by being mounted in the electronic unit container. Accordingly, the number of parts can be reduced by eliminating the need for the separate electronic unit container which is necessary with the prior art electrical connection box, with the result that a production cost can be reduced. Further, since the electronic unit is connected not at the vehicle assembly line, but during the assembling of the electrical connection box, an electrical connection check can be made for the assembled electrical connection box. Furthermore, a transportation cost can be reduced because the assembled electrical connection box, i.e. a one-piece part can be shipped to the car manufacturer.

Further, the circuit board can be inserted into the electronic unit container with an improved operability by forming the guide grooves on the opposite inner surfaces of the electronic unit container and by tapering the leading ends of the guide grooves at the opening. Further, by constructing the lid such that it is in flush with the opening edge of the electronic unit container when the lid mounted with the circuit board is properly inserted into the electronic unit container, an operator can easily see whether the circuit board is properly or partly connected.

What is claimed is:

1. An electrical connection box for an automotive vehicle, comprising:

internal circuits which are accommodated in a casing, and which are divided at least into large current circuits for accommodating currents above a selected level, medium current circuits for accommodating a range of current levels less than the large current circuits and small current circuits for accommodating current levels less than the medium current circuits, wherein the large current circuits are substantially constructed by at least one busbar, the medium current circuits are substantially constructed by wires and cramping terminals connectable with the wires, and the small current circuits are constructed by at least one flexible printed circuit, the wires of the medium current circuits being arranged along wire arrangement guides provided at an insulation plate disposed in the casing, and wherein the at least one busbar is placed on upper end portions of said at least one wire arrangement guides, so as to arrange the wires and the busbar on spaced planes, and wherein the flexible printed circuit is folded at one end surface of the insulation Plate, so as to extend along first and second surfaces of one side portion of the insulation plate.

2. An electrical connection box according to claim 1, wherein the internal circuits comprise at least two of the group of large current circuits, medium current circuits and small current circuits.

3. An electrical connection box according to claim 1, further comprising a fuse box provided with a fuse receptacle, said fuse box being lockingly mounted by a fuse box locking portion projecting from a side portion of the first surface of the insulation plate where the flexible printed circuit is placed, and wherein a connector box is lockingly mounted by a connector box locking portion projecting from a side portion of the second surface of the insulation plate where the flexible printed circuit is placed, and wherein the upper and lower casings, are formed with an opening through which the fuse box projects and an opening through which the connector box projects.

4. An electrical connection box according to claim 3, further comprising a compact integrated fuse, in which fusible elements made of conductive strips, are arranged at predetermined intervals on a fuse insulation plate, said fuse being fitted into a fuse receptacle of the fuse box, upstream contact surfaces of the fusible elements being connected with the wires through terminals connected therewith, downstream contact surfaces the fusible elements being connected with the flexible printed circuit through terminals connected therewith on the first surface of the insulation plate.

5. An electrical connection box according to claim 3, wherein terminals connected with the flexible printed circuit on the second surface of the insulation plate project into terminal chambers of the connector box.

6. An electrical connection box according to claim 1, wherein electronic devices are placed on the flexible printed circuit on the first surface of the insulation plate and are connected with conductive paths of the flexible printed circuit.

7. An electrical connection box according to claim 1, wherein one or more tabs are provided at the busbar for connection with external terminals, and wherein the cramping terminals connected with the wires, each are provided with an external terminal connection portion so as to be connectable with an external terminal.

* * * * *